United States Patent
Wu et al.

(10) Patent No.: US 10,586,147 B2
(45) Date of Patent: Mar. 10, 2020

(54) NEUROMORPHIC COMPUTING DEVICE, MEMORY DEVICE, SYSTEM, AND METHOD TO MAINTAIN A SPIKE HISTORY FOR NEURONS IN A NEUROMORPHIC COMPUTING ENVIRONMENT

(71) Applicant: INTEL CORPORATION, Santa Clara, CA (US)

(72) Inventors: Wei Wu, Portland, OR (US); Charles Augustine, Portland, OR (US); Somnath Paul, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 681 days.

(21) Appl. No.: 15/273,505

(22) Filed: Sep. 22, 2016

(65) Prior Publication Data

US 2018/0082176 A1    Mar. 22, 2018

(51) Int. Cl.
  *G06N 3/063*   (2006.01)
  *G06N 3/04*    (2006.01)
  *G06N 3/08*    (2006.01)

(52) U.S. Cl.
  CPC ........... *G06N 3/063* (2013.01); *G06N 3/049* (2013.01); *G06N 3/088* (2013.01)

(58) Field of Classification Search
  CPC ...................................................... G06N 3/063
  See application file for complete search history.

(56) References Cited

U.S. PATENT DOCUMENTS

| 8,756,183 B1* | 6/2014 | Daily ............... G06N 3/049 706/20 |
| 2012/0259804 A1 | 10/2012 | Brezzo et al. |
| 2013/0073499 A1* | 3/2013 | Izhikevich ........... G06N 3/049 706/27 |
| 2014/0032459 A1 | 1/2014 | Sinyavskiy et al. |
| 2014/0372355 A1 | 12/2014 | Izhikevich et al. |
| 2016/0086076 A1* | 3/2016 | Alvarez-Icaza Rivera ................. G06N 3/06 706/25 |

(Continued)

OTHER PUBLICATIONS

Fidjeland, et al., "Accelerated Simulation of Spiking Neural Networks Using GPUs" The 2010 International Joint Conference on Neural Networks (IJCNN) (Year: 2010).*

(Continued)

*Primary Examiner* — Li B. Zhen
*Assistant Examiner* — Brian C. Downing
(74) *Attorney, Agent, or Firm* — Konrad Raynes Davda & Victor LLP; David W. Victor

(57) ABSTRACT

Provided are a neuromorphic computing device, memory device, system, and method to maintain a spike history for neurons in a spiking neural network. A neural network spike history is generated in a memory device having an array of rows and columns of memory cells. There is one row of the rows for each of a plurality of neurons and columns for each of a plurality of time slots. Indication is made in a current column in the row of the memory cells for a firing neuron that a spike was fired. Indication is made in the current column in rows of memory cells of idle neurons that did not fire that a spike was not fired. Information in the array is used to determine a timing difference between a connected neuron and the firing neuron and to adjust a weight of the connecting synapse.

21 Claims, 7 Drawing Sheets

(56) References Cited

U.S. PATENT DOCUMENTS

2016/0203858 A1 7/2016 Kim et al.
2016/0267379 A1 9/2016 Eleftheriou et al.

OTHER PUBLICATIONS

Vreeken, "Spiking neural networks, an introduction", 2003 (Year: 2003).*

Akopyan, et. al., "TrueNorth: Design and Tool Flow of a 65 mW 1 Million Neuron Programmable Neurosynaptic Chip", IEEE Transactions on Computer-Aided Design of Integrated Circuits and Systems, vol. 34, No. 10, Oct. 2015 (Year: 2015).*

Seo, et. al., "A 45nm CMOS Neuromorphic Chip with a Scalable Architecture for Learning in Networks of Spiking Neurons",2011 IEEE Custom Integrated Circuits Conference (CICC). (Year: 2011).*

JBoy, "Help trying to understand modulo operation in circular array", https://stackoverflow.com/questions/5964771/help-trying-to-understand-modulo-operation-in-circular-array (Year: 2011).*

Gruning, A., et al., "Spiking Neural Networks: Principles and Challenges", Proceedings of the 2014 European Symposium on Artificial Neural Networks, Computational Intelligence, and Machine Learning, Apr. 2014, 10 pp.

Iakymchuk, T., et al., "Simplified Spiking Neural Network Architecture and STDP Learning Algorithm Applied to Image Classification", EURASIP Journal on Image and Video Processing, 2015, 11 pp.

Qazi, M., et al., "Challenges and Directions for Low-Voltage SRAM", IEEE Design & Test of Computers, vol. 28, Iss. 1, Jan. 2011, 12 pp.

Vreeken, J., "Spiking Neural Networks, An Introduction", 2003, 5 pp.

Wang, R.M., et al., "A Neuromorphic Implementation of Multiple Spike-Timing Synaptc Plasticity Rules for Large-Scale Neural Networks", Frontiers in Neuroscience, vol. 9, Article 180, May 2015, 17 pp.

Wang, R., et al., "A Programmable Axonal Propagation Delay Circuit for Time-Delay Spiking Neural Networks", Proceedings of the 2011 IEEE International Symposium on Circuits and Systems, May 2011, 4 pp.

International Search Report and Written Opinion for International Application No. PCT/US2017/052965, dated Jan. 4, 2018, 12 pp. [77.354PCT (ISR & WO)].

International Preliminary Report on Patentability for International Application No. PCT/US2017/052965, 9 pp., Apr. 4, 2019. [77.354PCT (IPRP)].

* cited by examiner

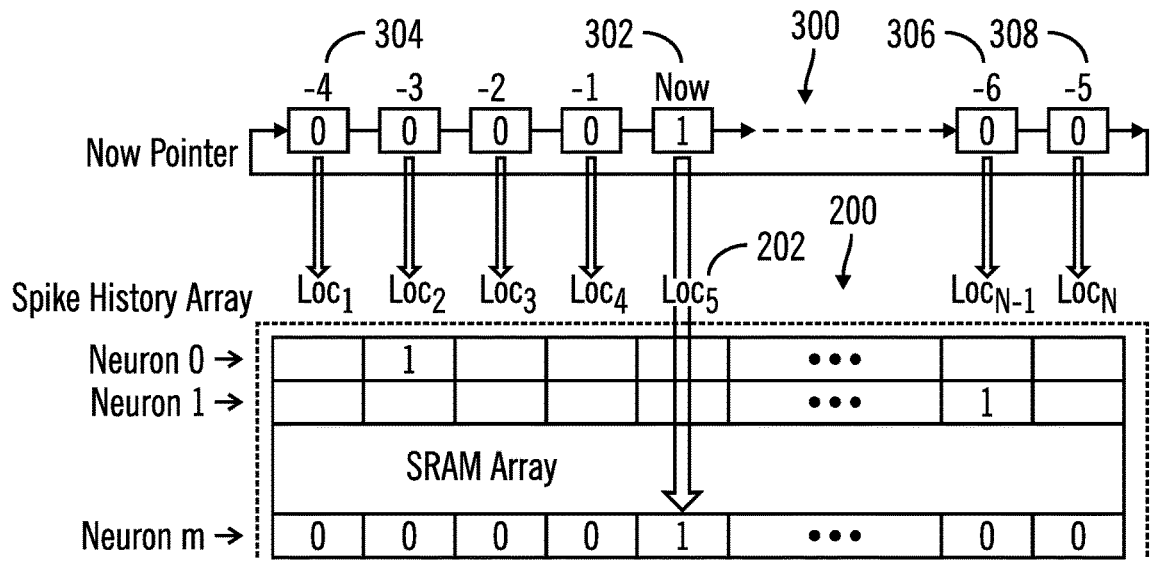
FIG. 2
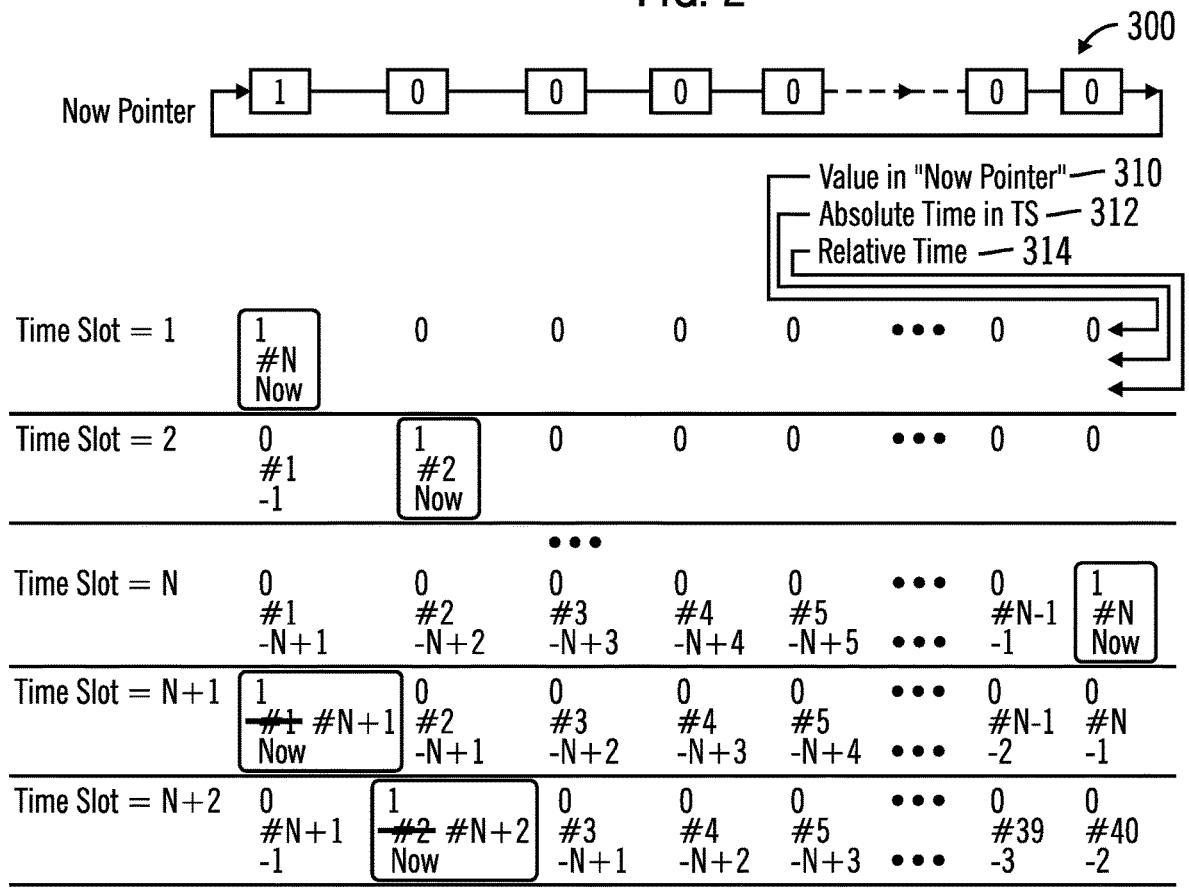
FIG. 3                Now Pointer and timing illustration Synapse Information Neuron Membrane Potential SRAM array with column-wise RESET Port

US 10,586,147 B2

NEUROMORPHIC COMPUTING DEVICE, MEMORY DEVICE, SYSTEM, AND METHOD TO MAINTAIN A SPIKE HISTORY FOR NEURONS IN A NEUROMORPHIC COMPUTING ENVIRONMENT

TECHNICAL FIELD

Embodiments described herein generally relate to a computer product, method, and system to a neuromorphic computing device, memory device, system, and method to maintain a spike history for neurons in a neuromorphic computing environment.

BACKGROUND

Spiking neuron network (SNN) hardware has been demonstrated to be a promising alternative to traditional Von-Neumann architecture for processing real-world intelligent applications, such as to emulate intelligence and human recognition and cognitive activity. In an SNN, a digital representation of neurons interact with neighboring neurons over synapses connecting the neurons. When a postsynaptic neuron receives a weighted spike over a synapse from a firing presynaptic neuron, a membrane potential of the postsynaptic neuron is increased. When the membrane potential of a neuron reaches a threshold, then that neuron fires a spike across all the synapses in which it is a presynaptic neuron. The synapses have plasticity to adjust their gain/weight according to one or more adaptation rules. Some of the different rules to adjust the synapse weight are based on a timing differential of when the postsynaptic and presynaptic neurons for a synapse fire a spike. Some of the weight adjustment rules include Spike Timing Dependent Plasticity (STDP) and Spike Timing Dependent Delay Plasticity (STDDP). With these techniques, the weight of the synapse used to adjust the spike transmitted over the synapse will be increased if a presynaptic spike arrives before the postsynaptic spike is fired and decreased if presynaptic spike arrives after the postsynaptic spike fires. The change of the weight is determined by the duration between the arrival times of two spikes.

A computational SNN maintains three sets of electronic storage: (1) for neurons, to store each neuron's potential; (2) for synapses, including weight, delay and connections; and (3) for spikes, to keep track of the timing information of when spikes are fired at the neurons.

Described embodiments provide improved techniques for maintaining spike history information on the timing of spikes at the neurons for use in adjusting the synaptic weights in a computational neural network.

BRIEF DESCRIPTION OF THE DRAWINGS

Embodiments are described by way of example, with reference to the accompanying drawings, which are not drawn to scale, in which like reference numerals refer to similar elements.

FIGS. 2 and 3 illustrate embodiments of a spike history array and now pointer.

DESCRIPTION OF EMBODIMENTS

Described embodiments provide techniques to reduce the number of operations required to maintain timing information on when neurons fire or spike. In described embodiments, a spike history array provides an array of memory cells, where rows provide timing information for neurons in columns representing a last number of time slots in which the timing of a last occurring spike is indicated for one of the neurons. The cells in the column for the current timeslot are cleared and only updated in rows of firing neurons that fire in that current timeslot. The other columns in the firing neuron row other than the entry for the current timeslot are cleared to indicate that there is no firing. In this way, a neuron row is only updated when the neuron represented by the row fires a spike. This optimizes operations to keep track of neuron firing by only having to update one column and the row of the firing neurons, and to provide an improved technique for recording the timing information and adjusting the synaptic weights based on timing differences of when the neurons fire.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

Figure 1:
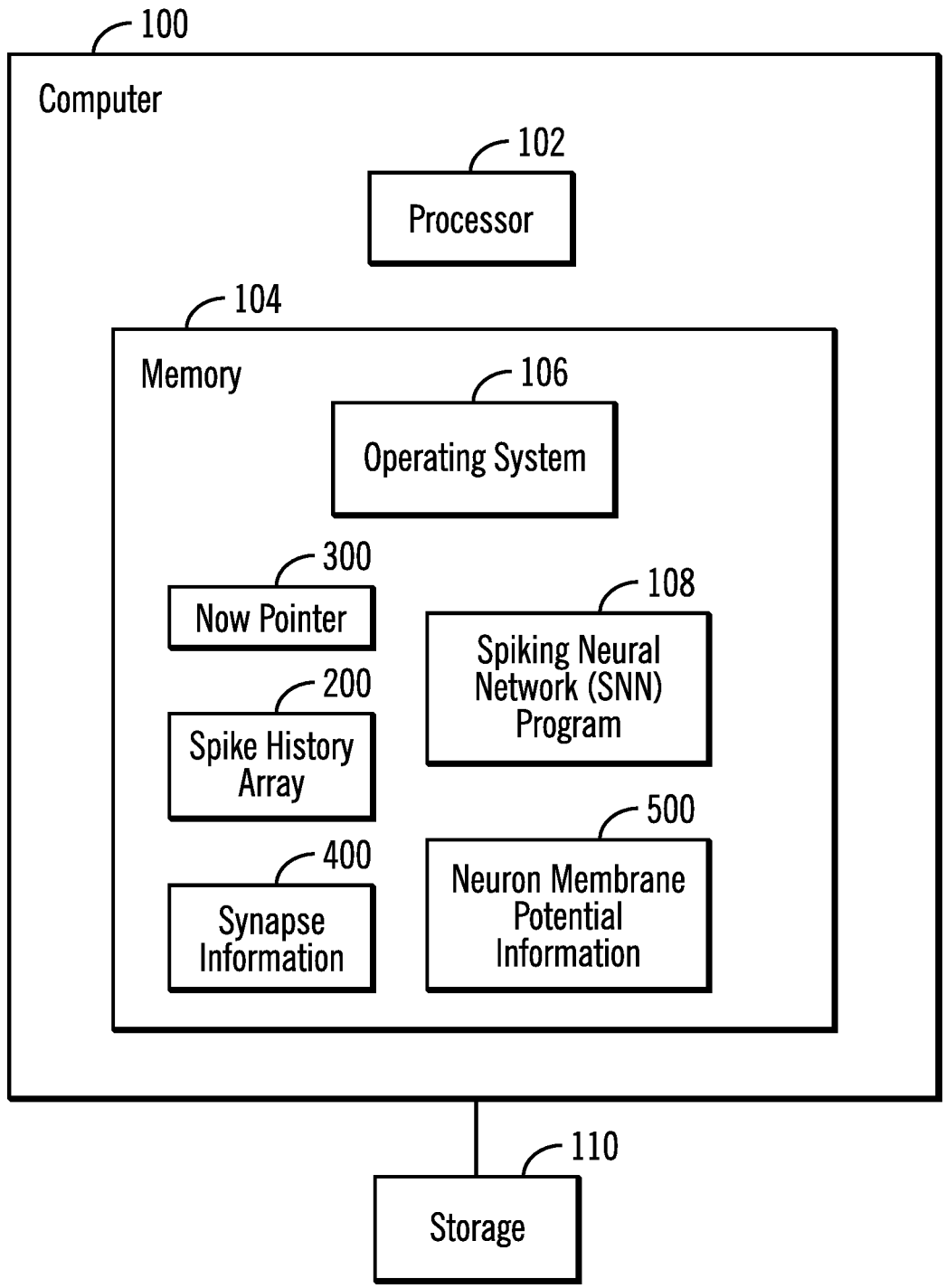
FIG. 1 illustrates an embodiment of a neural network computing environment

FIG. 1 illustrates an embodiment of a spiking neural network computing environment comprising a computing system 100 having a processor 102 and a memory 104 including an operating system 106, which manages computer hardware and software resources, provides common services for computer programs, and manages program execution and scheduling, and a spiking neural network (SNN) program 108 to perform neural network computations. The SNN program 108 maintains a spike history array 200 providing timing information on when neurons in the neural network fire a spike on connected synapses, a now pointer 300 comprising a circular shift register indicating a current timeslot at which the neural network is processed, synapse information 400 providing information on each synapse over which a presynaptic neuron and postsynaptic neuron communicate; and neuron membrane potential information 500 having the membrane potential information accumulated for the neurons in the neural network. The computer 100 further includes a storage 110 in which programs, such as the operating system 106 and SNN program 108 and information 200, 300, and 400, may be stored and loaded into the memory 104. The combination of the spike history array 200, synapse information 400, and neuron membrane potential information 500 provide a computational representation of the neural network and its interconnected neurons The processor may comprise a neuromorphic core or neuromorphic machine including the components of the neural network implementation, such as 200, 300, 400, 108, and 500.

The memory 104 may comprise one or more non-volatile and/or volatile memory devices, such as a Flash Memory, a non-volatile dual in-line memory module (NVDIMM), DIMM, Static Random Access Memory (SRAM), Dynamic Random Access Memories (DRAMs), as NAND dies of flash memory cells, ferroelectric random-access memory (FeTRAM), nanowire-based non-volatile memory, three-dimensional (3D) cross-point memory, phase change memory (PCM), memory that incorporates memristor technology, Magnetoresistive random-access memory (MRAM), Spin Transfer Torque (STT)-MRAM and other electrically erasable programmable read only memory (EEPROM) type devices.

In one embodiment, the memory 104 may comprise one or more SRAM memory devices or other non-volatile memory devices known in the art. In an alternative embodiment, the memory 104 may comprise a main memory, such as a DRAM, for storing programs, e.g., 106 and 108, being executed, and a separate non-volatile memory, such as an SRAM or flash memory, storing the spike history array 200, now pointer 300, synapse information 400, and neuron membrane potential information 500.

The storage 110 may comprise a non-volatile storage or memory, such as NAND dies of flash memory cells, NVDIMM, SRAM, ferroelectric random-access memory (FeTRAM), nanowire-based non-volatile memory, three-dimensional (3D) cross-point memory, phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices. The storage device 110 may also comprise a magnetic storage media, such as a hard disk drive etc.

In FIG. 1, the SNN program 108 is implemented in a neuromorphic computing device comprising a computer system 100 having a processor 102 and operating under control of an operating system 106. In alternative embodiments, the neuromorphic computing device implementing the SNN program 108 may comprise a hardware device, such as an application specific integrated circuit (ASIC) or other hardware device including hardware logic, such as a system on a chip (SOC) dedicated to the SNN program 108 operations. Still further, the neuromorphic computing device may comprise a combination of a computer system and dedicated hardware.

FIG. 2 illustrates an embodiment of the spike history array 200 and now pointer 300. The spike history array 200 comprises an array of memory cells having a row for each of the neurons in the neural network and N columns for N different timeslots. Each row for a neuron, e.g., Neuron 0, Neuron 1, Neuron m, in the spike history array 200 indicates the time slot at which the neuron most recently fired, where each column of the spike history array 200 corresponds to a column in the now pointer 300 providing a relative timeslot to the current timeslot at which processing is occurring, represented by the current entry 302 in the now pointer 300.

In certain embodiments, after a neural network clock, timing cycle or timeslot, if a neuron fired during that time cycle, the entry or column for the current time 302 in the now pointer 300 is set to indicate a current time, e.g., set to a "1" and all other entries are set to "0". The current column or current entry 302 in the now pointer 300 corresponds to a current column 202 in the spike history array 200 array. If a spiking neuron fires in a timeslot identified by the current entry 302 in the now pointer 300, the corresponding current column 202 in the firing neuron row in the spike history array 200 array of memory cells is set to "1" to indicate firing at the current time, and all other entries for other timeslots in the rows for idle neurons not firing are set to "0". In this way, each neuron row of the array 200 indicates a most recent time the neuron fired in the last N timeslots. The other cells in that column are set to "0" or some other value to indicate no firing, so that firing events in other timeslots other than the current timeslot are not indicated when the neuron fires at the current timeslot.

In one embodiment, the now pointer 300 comprises a circular shift register, such that for each time cycle, or change to a next timeslot, the values for the first entry 304 through next to last entry 306 are shifted to the right and the value in the last entry 308 is shifted to the first entry 304, where all values are simultaneously shifted. In an alternative embodiment, the values for the first entry 304 through the last entry 306 may shift in a different manner, such as to the left, etc.

An entry i in the now pointer 300 to the left of the current entry 302 indicates the (current entry minus ith) previous timeslot and an entry j in the now pointer 300 to the right of the current entry 202 indicates the (N−(j-current entry))th previous timeslot.

FIG. 3 provides a timing illustration of entries in the now pointer 300 to timeslots at different time slots 1 through N+2 timeslots, where there are N entries in the now pointer 300. For each time slot row representation, for Time Slot=1, 2, N, N+1, N+2, there is a value for each entry in the now pointer 310; an absolute time row 312 for the 1 through N+2 time slots; and a relative time 314 for each entry in the last N time slots relative to the current timeslot. The information in the relative time 314 row may be used to determine a time difference between two entries in the now pointer 300 and two corresponding columns in the spike history array 200 to determine the time difference between when two neurons fired based on the difference between columns in the neuron rows having a "1", indicating the time slot in which the two neurons last fired.

Figure 4:
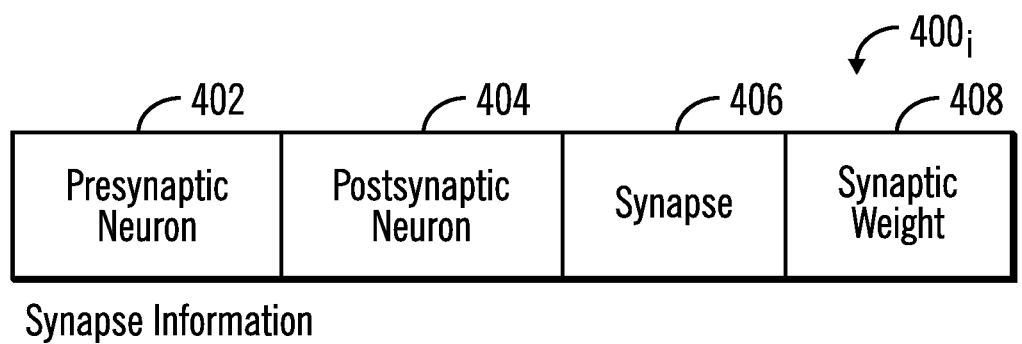
FIG. 4 illustrates an embodiment of synapse information.

FIG. 4 illustrates an embodiment of a synapse information 400, instance maintained for each synapse in the synapse information 400, and includes a presynaptic neuron 402 identifier; a postsynaptic neuron 404 identifier; a synapse identifier 406 of a synapse between the neurons 402 and 404; and a synaptic weight 408 applied to the spike fired from the presynaptic neuron 402 onto the synapse 406 that reaches the postsynaptic neuron 404. There may be multiple synapses connecting to one postsynaptic neuron, i.e., fanning into the postsynaptic neuron, and one presynaptic neuron may fire onto multiple synapses to transmit to different postsynaptic neurons, i.e., fanning out to the postsynaptic neurons. The synapse information instances 400, for all the synapses provides the arrangement and mapping of the neurons in the neural network.

The synaptic weight 408 may be calculated using spike time dependent (STDP) plasticity learning based on timing differences between presynaptic and postsynaptic firing spikes. In certain embodiments, for a synapse, when a postsynaptic spike occurs in a specific time window after a presynaptic spike, the weight of this synapse may be increased. Likewise, if the postsynaptic spike occurs before the presynaptic spike, the weight of the synapse may be decreased. The strength of the weight change is a function of time between presynaptic and postsynaptic spike events. Another algorithm for calculating the synapse weight is a Spike Timing Dependent Delay Plasticity (STDDP) algorithm. Both these synapse weighting algorithms of STDP and STDDP are based on timing differences of firings by the presynaptic 402 and postsynaptic 404 neurons. These techniques are used to determine the synaptic weight 408 to apply to a spike fired by the presynaptic neuron 402 on the synapse 406 that reaches the postsynaptic neuron 404.

Figure 5:
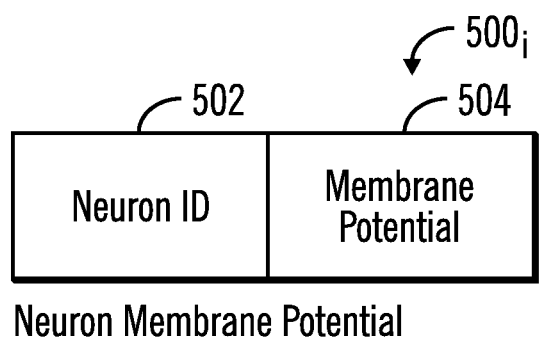
FIG. 5 illustrates an embodiment of neuron membrane potential information.

FIG. 5 illustrates an embodiment of a neuron membrane potential instance 500, maintained for each neuron in the neural network in the membrane potential information 500, and includes for an identified neuron 502 a membrane potential 504. Additional information may also be provided, such as information used to determine the decay of a membrane potential. The membrane potential 504 for a neuron accumulates the potential values of weighted spikes received on the synapse for which the neuron 502 is a postsynaptic neuron. When the accumulated membrane potential 504 reaches a threshold, the neuron 502 may fire and the membrane potential 504 is then reset to zero. Further, a value in the membrane potential 504 may decay over time slots according to a decay algorithm for membrane potential.

Figure 6A:
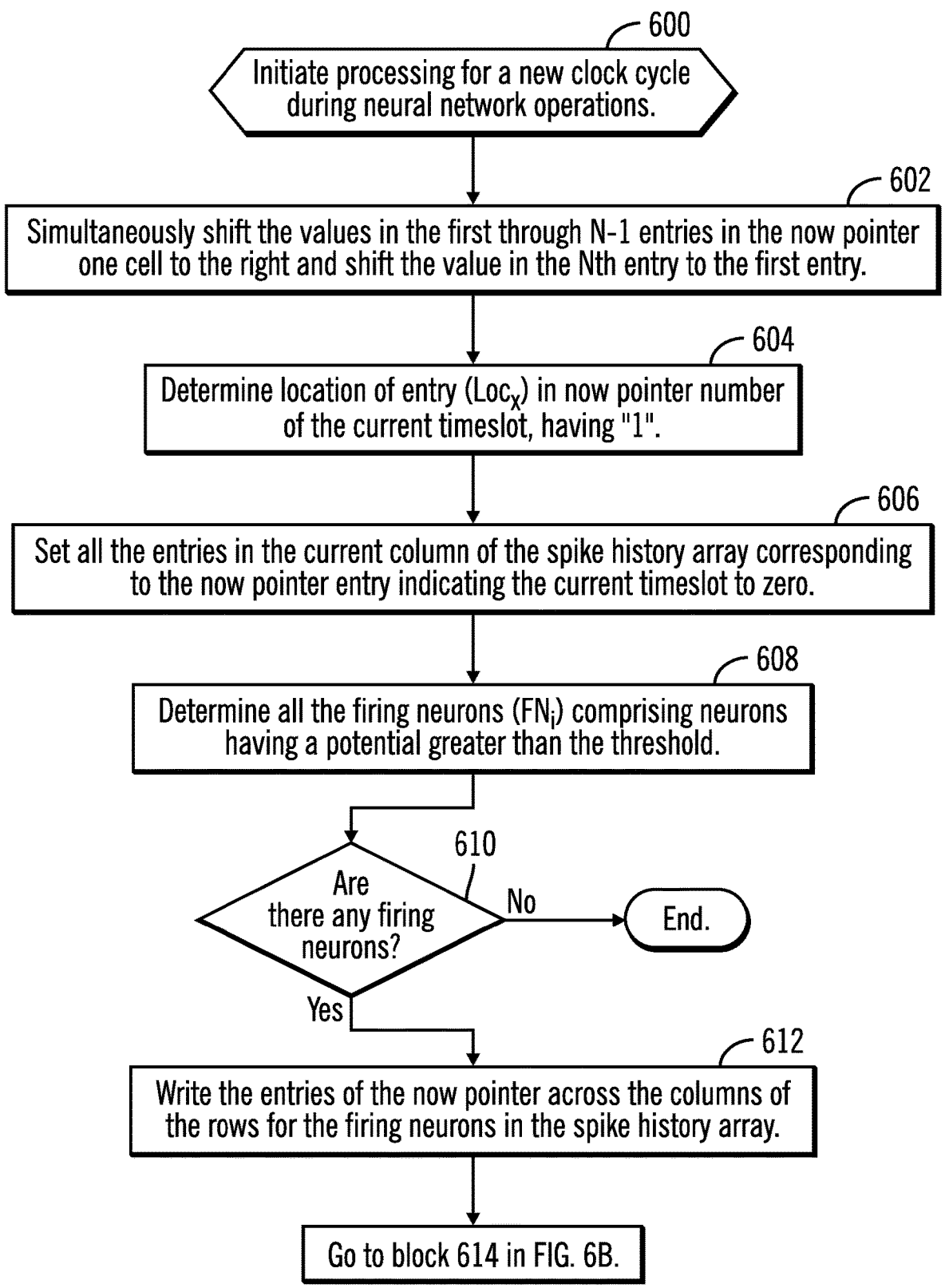
FIGS. 6a, 6b, and 6c illustrate an embodiment of operations to update information on the neurons and synapses in a neural network.
Figure 6B:
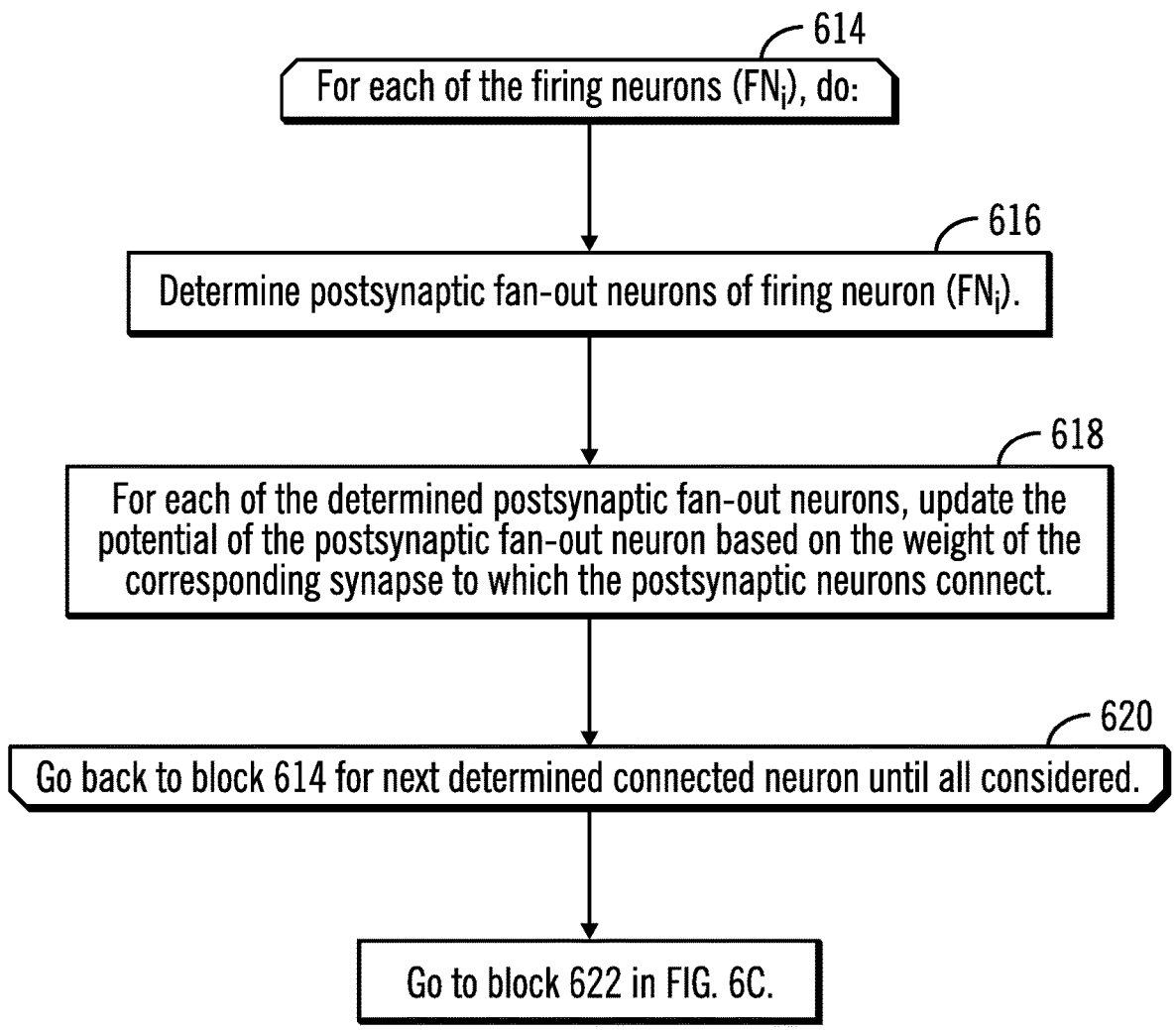
Figure 6C:
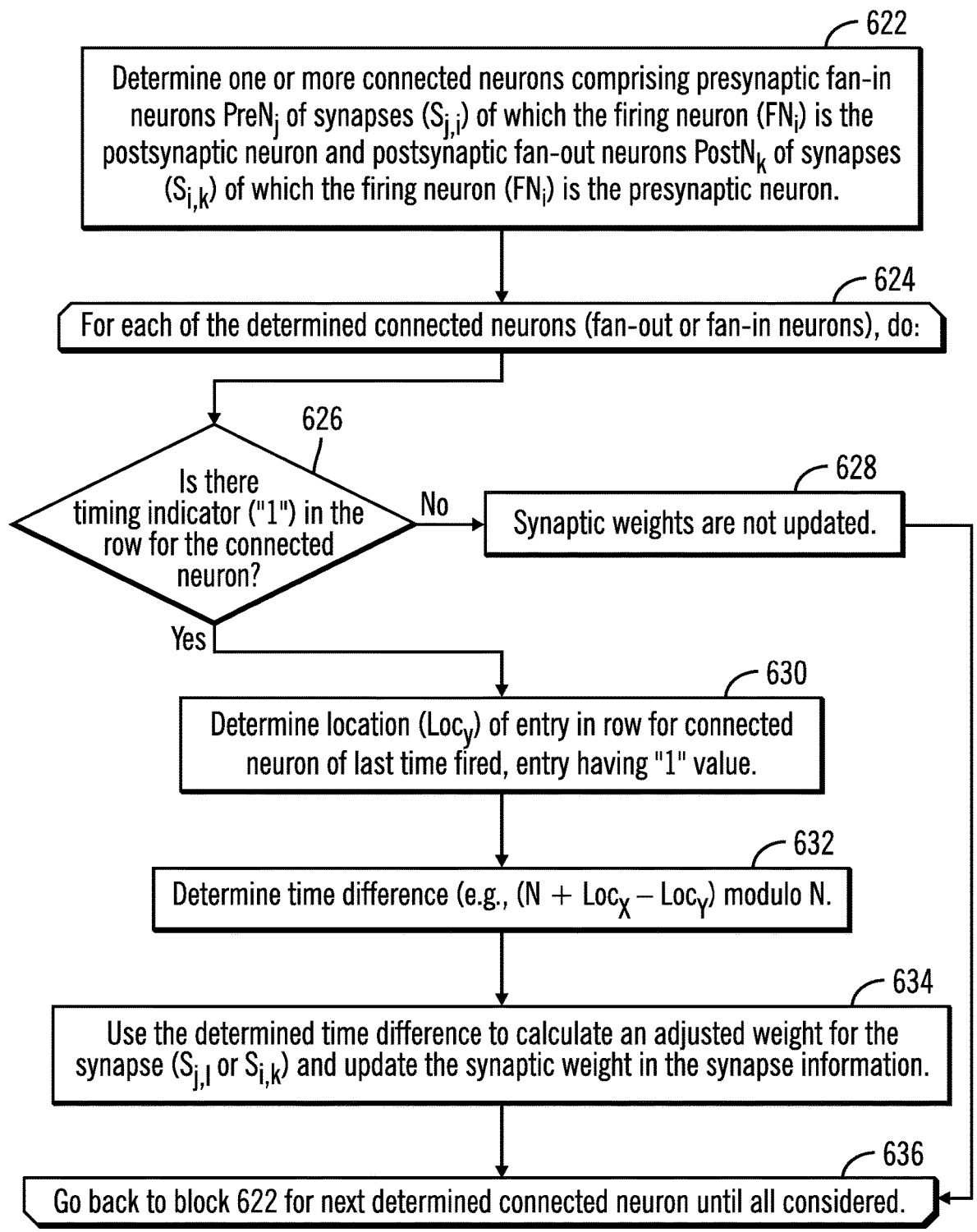

FIGS. 6a, 6b, and 6c illustrate an embodiment of operations performed by the spiking neural network (SNN) program 108 to process the spike history array 200 to determine timing differences for currently firing neurons used to adjust the synaptic weights 408. With respect to FIG. 6a, upon a new clock cycle occurring (at block 600) for the neural network operations, the SNN program 108 simultaneously shifts (at block 602) the values in the first 304 through N−1th 306 entries in the now pointer 300 one cell to the right and shifts the value in the Nth entry 308 to the first entry 304. The SNN program 108 determines (at block 604) a location of the entry ($Loc_X$) in the now pointer 300, or entry number, of the current timeslot 302, having a "1". All the entries in the current column 202 of the spike history array 200 corresponding to the now pointer current entry 302 indicating the current timeslot are set (at block 606) to zero to indicate no spike firing in the last N timeslots.

The SNN program 108 determines (at block 608) all the firing neurons ($FN_i$), if any, comprising those neurons 502 having a membrane potential 504, in their neuron membrane potential information $500_i$, greater than a threshold used to determine when to trigger a spike. If (at block 610) there are no firing neurons 608, i.e., only idle neurons, then control ends. If (at block 610) there are one or more firing neurons ($FN_i$), then to update the timing information in the spike history array 200, the SNN program 108 writes (at block 612) the N entries of the adjusted now pointer 300 across the N columns of the rows of the firing neurons in the spike history array 200. Writing the now pointer 300 across the columns of one of the neuron rows, writes all zeros to the columns of the row that are not the current column 202 and writes a one ("1") to the current column 202 entry in the firing neuron row indicating that firing occurred in the current timeslot. Thus, writing of the now pointer 300 resets all the cells in the firing neuron rows to "0" that are not in current column 202. The now pointer 300 may be simultaneously applied across all the firing neuron rows of the spike history array 200.

With respect to FIG. 6b, a loop of operations is performed at block 614 through 620 for each of the determined firing neurons ($FN_i$), comprising those neurons having a membrane potential 504 greater than a threshold.

At block 616, a determination is made of the postsynaptic fan-out neurons 404 receiving the spike from the firing neuron 402 over synapses 406 ($S_{ij}$) whose presynaptic neuron 402 is the firing neuron ($FN_i$). For each of the determined postsynaptic fan-out neurons 404, the SNN program 108 updates (at block 618) a potential 500, of the postsynaptic fan out neuron based on the weight of the corresponding spike from the synaptic weight 408 and adds that weighted potential from the synapse to the membrane potential 504 for the determined postsynaptic fan-out neuron 404.

Control then proceeds to block 622 in FIG. 6c where the SNN program 108 determines (at block 620) from the synapse information 400 one or more connected neurons. A "connected neuron" comprises presynaptic fan-in neurons 402 ($PreN_j$) of synapses 406 ($S_{j,i}$) in synapse information $400_{j,i}$ instances for which the firing neuron ($FN_i$) is the postsynaptic neuron 404 and postsynaptic fan-out neurons 404 ($PostN_k$) of synapses 406 ($S_{i,k}$) in synapse information $400_{j,i}$ instances for which the firing neuron ($FN_i$) is the presynaptic neuron 402 communicating the spike to the fan-out neurons. For each of the connected neurons, i.e., determined presynaptic fan-in neurons ($PreN_j$) and postsynaptic fan-out neurons ($PostN_k$), a loop of operations is performed at blocks 624 through 636. If (at block 626) there is no timing indicator, e.g., a "1", in the row for the connected neuron ($PreN_j$ or $PostN_k$), then the synaptic weight 408 for the synapse 406 ($S_{j,i}$ or $S_{i,k}$) between the determined firing neuron ($FN_i$) and the connected neuron ($PreN_j$ or $PostN_k$) is not updated (at block 628). If (at block 626) there is a timing indicator, e.g., "1", indicating firing in the row of the determined presynaptic neuron ($PreN_j$) in the last N time cycles, then the SNN program 108 determines (at block 630) a location ($Loc_Y$) of the entry in the row for the connected neuron ($PreN_j$ or $PostN_k$) indicating last time fired, i.e., the number of the entry having a "1" value. The location $Loc_Y$ of the timing indicator, e.g., "1", for the connected neuron may be determined by using a one-hot decoder on the row of the array for the connected neuron to calculate the location or entry of the timing indicator, or "1".

The relative time difference for the firing time for the connected neuron ($PreN_j$ or $PostN_k$) from the current time slot ($Loc_X$) depends on whether the column location of the presynaptic neuron ($Loc_Y$) is to the right or left of the current time column 202, 302. If the $Loc_Y$ is to the left of the current column/time 202, 302, then the timing difference is $Loc_X$ minus the $Loc_Y$. If the $Loc_Y$ of the entry when the connected neuron ($PreN_j$ or $PostN_k$) fired is to the right of the current time 302, then the current time has wrapped, and the timing difference is $Loc_X$ minus ($N-(Loc_Y-Loc_X)$). In one embodiment, the time difference may be determined (at block 632) according to equation (1) below, where N is the number of entries in the now pointer 300, or number of columns in the spike history array 200:

$$(N + Loc_X - Loc_Y) \text{ modulo } N \tag{1}$$

The SNN program 108 uses (at block 634) the determined time difference to calculate an adjusted weight 408 for the synapse 406 and updates the synaptic weight 408 in the synapse information 4001 for the determined firing neuron as the presynaptic 402 or postsynaptic 404 neuron and the connected neuron as the postsynaptic 404 or presynaptic 402 neuron, respectively. The SNN program 108 may use the determined timing difference with an STDP or STDDP type algorithms, and other timing difference algorithms, to determine a synaptic weight 408 for the synapse to the firing neuron.

With the operations of FIGS. 6a, 6b, and 6c, the SNN program 108 may update the spike history array 200 to indicate in the rows of the array for the firing neurons the timing at which the firing neurons fired a spike on a synapse and to update the synaptic weight 408 based on a timing differential for all synapses having one of the firing neurons as a postsynaptic neuron. With the described embodiments, the SNN program 108 minimizes the operations performed on the memory cells of the array 200 by first resetting all the bits in the current column 202 of the array 200 to zero, such as by setting them to ground, and then writing the row pointer across all the rows of the firing neurons, which may be performed simultaneously on all the word lines through the rows of the firing neurons in the memory array 200.

Figure 7:
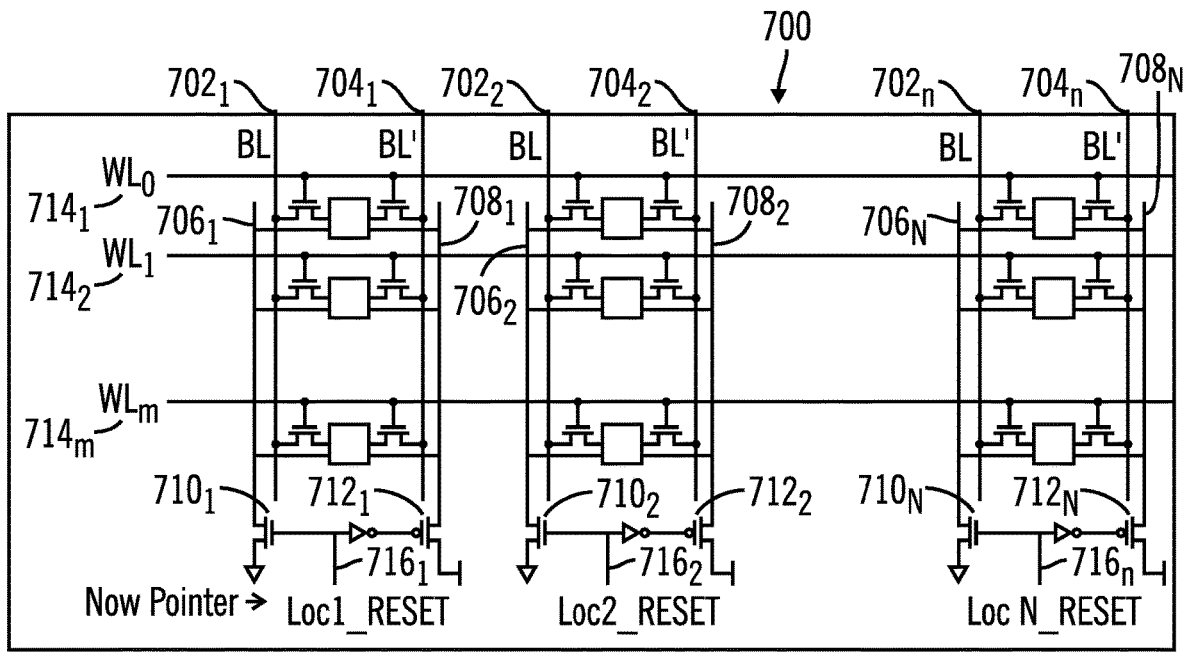
FIG. 7 illustrates an embodiment of a memory device array used to store the spike history array information.

FIG. 7 illustrates an embodiment of the memory 104 in which the spike history array 200 is implemented in an SRAM array 700 having write ports of write bit lines BL $702_1$, $702_2$ ... $702_N$ and BL' $704_1$, $704_2$ ... $704_N$ for each column of cells and column-wise RESET ports comprising two bit lines, BL $706_1$, $706_2$ ... $706_N$ and BL' $708_1$, $708_2$ ... $708_N$ for each column of cells. In each column, one reset bit line (BL) $706_1$, $706_2$ ... $706_N$ is connected to ground (GND) $710_1$, $710_2$ ... $710_N$ and the other bit line (BL') $708_1$, $708_2$ ... $708_N$ is connected to voltage (VCC) $712_1$, $712_2$ ... $712_N$. The array 700 includes word lines $714_0$ ($WL_0$), $714_1$ ($WL_1$), and $714_m$ ($WL_m$) on the rows of the array 700.

When $Loc_i\_RESET$ $716_i$ is "0", the NMOS gate and PMOS gate ($710_i$ & $712_i$) are both closed, so the RESET bit lines BL $706_i$ and BL' $708_i$ are not connected to any power or ground resulting in nothing written into the column, i.e. cell value remains. When $LOC_i\_RESET$ $716_i$ is "1", both gates are open, and BL $706_i$ is pulled down to ground and BL' $708_i$ is pulled up to VDD, so all cells along the current column are set to "0", i.e., the second value, as part of the operation at block 606 in FIG. 6a. After setting all the cells in the current column to "0" (second value) using the $LOC_i\_RESET$ $716_i$ for the current column, the now pointer 300 value is asserted on the write bit lines (BL $702_1$, $702_2$ ... $702_N$ and inverted value on BL' $704_1$, $704_2$ ... $704_N$) and then the $WL_i$ $714_i$ for the firing neurons will be activated, so the value on the bit lines can be written into the corresponding rows of cells, to perform the operation at block 612 in FIG. 6a.

In this way, there are two sets of bit lines $702_i/704_i$ and $706_i/708_i$ for each column, write bit lines $702_i/704_i$ for normal write (spike information update) and another set of bit lines $706_i/708_i$ for RESET purposes.

Since, the write data of the now pointer 300 is the same for all firing neurons that fire in that time slot, in one embodiment multiple of the word lines for the firing neurons can be activated at the same time by having multiple WL decoders with their outputs drive the WL lines simultaneously. In another embodiment, there may be one word line (WL) decoder and the word line (WL) driver signal for the firing neurons is OR-ed with an M-bit now pointer 300 selecting signal.

With the embodiment of the array 700 of FIG. 7, at step 606 in FIG. 6a, the setting of the entries in the current column of the array to zero may be performed by resetting the cells in the current column 202 to ground, such as by using a $Loc_X\_RESET$, on the entry X of the current column. The operation at block 612 in FIG. 6a to write the entries of the row pointer 800 to the rows of the firing neurons may be performed by asserting the now pointer 300 on all the word lines $714_i$ ($WL_i$) for the rows of the firing neurons in the array 700.

The described operations of the SNN program 108 may be implemented as a method, apparatus, device, computer product comprising a computer readable storage medium using standard programming and/or engineering techniques to produce software, firmware, hardware, or any combination thereof. The described operations may be implemented as code or logic maintained in a "computer readable storage medium". The term "code" as used herein refers to software program code, hardware logic, firmware, microcode, etc. The computer readable storage medium, as that term is used herein, includes a tangible element, including at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise a hardware device implementing firmware, microcode, etc., such as in an integrated circuit chip, a programmable logic device, a Programmable Gate Array (PGA), field-programmable gate array (FPGA), Application Specific Integrated Circuit (ASIC), etc. Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes physical and tangible components. Those skilled in the art will recognize that many modifications may be made to this configuration without departing from the scope of the present invention, and that the article of manufacture may comprise suitable information bearing medium known in the art.

In this way, the SNN program 108 may be implemented in a neuromorphic computing device comprising a computer readable storage medium or a hardware device, such as an application specific integrated circuit (ASIC), system on a chip (SOC), or a combination thereof.

Figure 8:
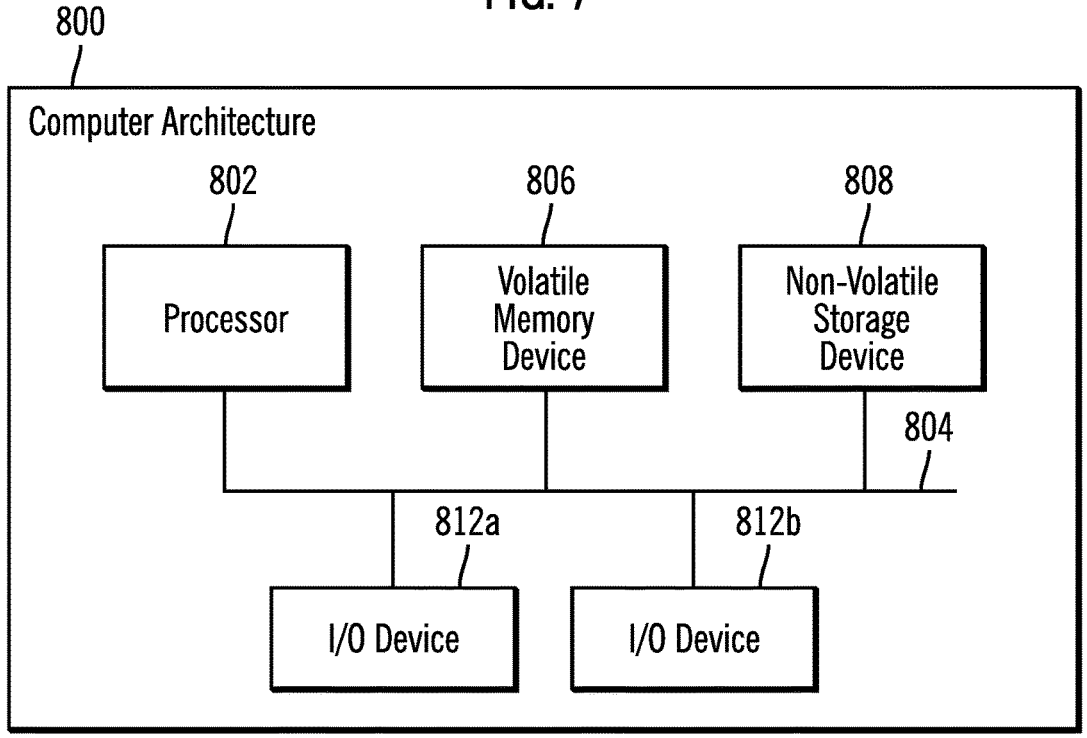
FIG. 8 illustrates an embodiment of a computer architecture in which embodiments may be implemented.

FIG. 8 illustrates an embodiment of a computer architecture 800, such as the components included in the computer system 100, including a processor 802 that communicates over a bus 804 with a volatile memory device 806 in which programs, operands and parameters being executed are cached, and a non-volatile storage device 804, such as target system memory 136. The bus 804 may comprise multiple buses. Further, the bus 804 may comprise a multi-agent bus or not be a multi-agent bus, and instead provide point-to-point connections according to PCIe architecture. The processor 802 may also communicate with Input/output (I/O) devices 812a, 812b, which may comprise input devices, display devices, graphics cards, ports, network interfaces, etc.

In certain embodiments, the computer node architecture 800 may comprise a personal computer, server, mobile device or embedded compute device. In a silicon-on-chip (SOC) implementation, the architecture 800 may be implemented in an integrated circuit die.

The reference characters used herein, such as i, j, are used to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

Examples

The following examples pertain to further embodiments.

Example 1 is a neuromorphic computing device implementing a spiking neural network program to maintain timing information on when neurons fire and that processes neural network information to maintain in a memory device to: generate a spike history in the memory device having an array of rows and columns of memory cells, wherein there is one row of the rows for each of a plurality of neurons of the spiking neural network, and columns for each of a plurality of time slots; in response to each of at least one firing neuron of the neurons firing a spike over a synapse at a current timeslot represented by a current column of the columns: indicate in the current column in the row of the memory cells for the firing neuron that the spike was fired in the current timeslot; indicate in the current column in rows of memory cells of idle neurons comprising neurons that did not fire that a spike was not fired; use information in the array to determine a timing difference between a connected neuron and the firing neuron to which the connected neuron connects over a synapse; and use the determined timing difference to adjust a weight of the synapse connecting the firing neuron and the connected neurons.

In Example 2, the subject matter of examples 1 and 3-12 can optionally include that the neuromorphic computing device is further to: generate a now pointer including an entry for each of the columns in the array, wherein entries in the now pointer correspond to time slots and include a current entry corresponding to the current column in the array and non-current entries corresponding to non-current timeslots, wherein the current entry is set to a first value and the non-current entries are set to a second value; and use the now pointer to indicate in at least one row of the at least one firing neuron the first value in the current column and the second value in the columns other than the current column, wherein the first value in one of the columns in the rows indicates firing of a spike at the time slot represented by the column in the row.

In Example 3, the subject matter of examples 1, 2 and 4-12 can optionally include that the use the now pointer comprises: write the first value and the second values in the entries of the now pointer to corresponding columns in the at least one row of the at least one firing neuron, wherein each of the rows includes one column entry having the first value and all other of the column entries having the second value.

In Example 4, the subject matter of examples 1-3 and 5-12 can optionally include that the memory device includes, for each of the rows of the array, a word line through cells in the row of the memory device and, for each of the columns of the array, at least one bit line through the cells in the column of the array, further to: set all cells in the current column to ground to set to the second value using the bit line for the current column; and activate the word lines for each row of the at least one firing neuron to write entries of the now pointer to the cells of the row.

In Example 5, the subject matter of examples 1-4 and 6-12 can optionally include that the now pointer comprises a circular shift register and that in response to a new time cycle, simultaneously shift a value in a first entry through a next to last entry in the now pointer to a right and shifting a value in a last entry to the first entry.

In Example 6, the subject matter of examples 1-5 and 7-12 can optionally include that the determine the timing difference comprises: determine a difference of a first column location number in the array having the first value for the firing neuron and a second column location number in the array having the first value for the connected neuron; and determine a timing difference between the firing neuron and the connected neuron based on the first and second column location numbers.

In Example 7, the subject matter of examples 1-6 and 8-12 can optionally include that the now pointer comprises a circular shift register, wherein the determine the timing difference comprises: (a number of entries in the now pointer plus a first column location number in the array having the first value for the firing neuron minus a second column location number in the array having the first value for the connected neuron) modulo the number of entries in the now pointer.

In Example 8, the subject matter of examples 1-7 and 9-12 can optionally include that the neuromorphic computing device is further to: set reset bit lines for a reset port for the current column of the array to set all cells in the current column of the array corresponding to the current entry in the now pointer to the second value; and after setting all the entries in the current column of the array to the second value, apply the now pointer along at least one word line for the at least one firing neuron to write the first value and the second values in the entries of the now pointer to corresponding columns in the rows of the at least one firing neuron, wherein the row for each of the at least one firing neuron includes the current column having the first value and all other of the columns having the second value.

In Example 9, the subject matter of examples 1-8 and 10-12 can optionally include that the adjust the weight of the synapse for each of at least one pair of the firing neuron and the connected neuron comprises: calculate a weight for the synapse based on the determined timing difference in response to one of the columns in the row for the connected neuron indicating that the connected neuron did fire, wherein a weight for the synapse is unchanged in response to all the columns in the row for the connected neuron indicating that the neuron did not fire.

In Example 10, the subject matter of examples 1-9 and 11-12 can optionally include that in response to each of the at least one firing neuron firing the spike, the neuromorphic computing device is further to: determine at least one connected postsynaptic neuron connected to the firing neuron over at least one synapse; and for each of the at least one connected postsynaptic neuron, do: determine a potential based on the weight of the synapse between the connected postsynaptic neuron and the firing neuron; increment a membrane potential for the connected postsynaptic neuron by the determined potential; and fire a spike by the connected postsynaptic neuron in response to the membrane potential exceeding a threshold.

In Example 11, the subject matter of examples 1-10 and 12 can optionally include that the connected neurons connected to each of the firing neurons includes fan-in presynaptic neurons that fire spikes to the firing neuron over the synapses and fan-out postsynaptic neurons that receive the spikes fired by the firing neurons.

In Example 12, the subject matter of examples 1-11 can optionally include that the neuromorphic computing device comprises at least one of a computer readable storage medium including program code implementing the spiking neural network program executed by a processor and an integrated circuit hardware device implementing hardware logic dedicated to implementing the spiking neural network program.

Example 13 is memory device to maintain timing information on when neurons fire for a spiking neural network, comprising: an array of rows and columns of memory cells, wherein there is one row of the rows for each of a plurality of neurons of the spiking neural network, and columns for each of a plurality of time slots, wherein a current column of the columns represents a current timeslot, wherein the current column in the row of the memory cells for the firing neuron indicates that the spike was fired in the current timeslot, wherein the current column in rows of memory cells of idle neurons comprising neurons that did not file indicate that a spike was not fired, wherein the information in the array is used to determine a timing difference between a connected neuron and the firing neuron to which the connected neuron connects over a synapse, and wherein the determined timing difference is used to adjust a weight of the synapse connecting the firing neuron and the connected neurons.

In Example 14, the subject matter of examples 13 and 15-17 can optionally include a now pointer including an entry for each of the columns in the array, wherein entries in the now pointer correspond to time slots and include a current entry corresponding to the current column in the array and non-current entries corresponding to non-current timeslots, wherein the current entry is set to a first value and the non-current entries are set to a second value, wherein the now pointer is used to indicate in at least one row of the at least one firing neuron the first value in the current column and the second value in the columns other than the current column, wherein the first value in one of the columns in the rows indicates firing of a spike at the time slot represented by the column in the row.

In Example 15, the subject matter of examples 13, 14, 16, and 17 can optionally include that for each of the rows of the array, a word line through cells in the row of the memory device and, for each of the columns of the array, at least one bit line through the cells in the column of the array, wherein all cells in the current column are set to ground to set to the second value using the bit line for the current column, and wherein the word lines for each row of the at least one firing neuron are activated to write entries of the now pointer to the cells of the row.

In Example 16, the subject matter of examples 13-15 and 16 can optionally include reset bit lines for a reset port for the current column of the array that is set to set all cells in the current column of the array corresponding to the current entry in the now pointer to the second value; and a word line for each of the neurons, wherein after setting all the entries in the current column of the array to the second value, the now pointer is applied along at least one word line for the at least one firing neuron to write the first value and the second values in the entries of the now pointer to corresponding columns in the rows of the at least one firing neuron, wherein the row for each of the at least one firing neuron includes the current column having the first value and all other of the columns having the second value.

Example 17 is a system implementing a spiking neural network program to maintain timing information on when neurons fire, comprising: a memory device; and a neuromorphic computing device implementing a spiking neural network program to: generate a spike history in the memory device having an array of rows and columns of memory cells, wherein there is one row of the rows for each of a plurality of neurons of the spiking neural network, and columns for each of a plurality of time slots; in response to each of at least one firing neuron of the neurons firing a spike over a synapse at a current timeslot represented by a current column of the columns: indicate in the current column in the row of the memory cells for the firing neuron that the spike was fired in the current timeslot; indicate in the current column in rows of memory cells of idle neurons comprising neurons that did not file that a spike was not fired; use information in the array to determine a timing difference between a connected neuron and the firing neuron to which the connected neuron connects over a synapse; and use the determined timing difference to adjust a weight of the synapse connecting the firing neuron and the connected neurons.

In Example 18, the subject matter of examples 17, 19, and 20 can optionally include that the spiking neural network program is further to: generate a now pointer including an entry for each of the columns in the array, wherein entries in the now pointer correspond to time slots and include a current entry corresponding to the current column in the array and non-current entries corresponding to non-current timeslots, wherein the current entry is set to a first value and the non-current entries are set to a second value; and use the now pointer to indicate in at least one row of the at least one firing neuron the first value in the current column and the second value in the columns other than the current column, wherein the first value in one of the columns in the rows indicates firing of a spike at the time slot represented by the column in the row.

In Example 19, the subject matter of examples 17, 18, and 20 can optionally include that the use the now pointer comprises: write the first value and the second values in the entries of the now pointer to corresponding columns in the at least one row of the at least one firing neuron, wherein each of the rows includes one column entry having the first value and all other of the column entries having the second value.

In Example 20, the subject matter of examples 17-19 and 20 can optionally include the memory device includes, for each of the rows of the array, a word line through cells in the row of the memory device and, for each of the columns of the array, at least one bit line through the cells in the column of the array, further to: set all cells in the current column to ground to set to the second value using the bit line for the current column; and activate the word lines for each row of the at least one firing neuron to write entries of the now pointer to the cells of the row.

Example 21 is a method for implementing a spiking neural network program in a neuromorphic computing device to maintain timing information on when neurons fire, comprising: generating a spike history in a memory device having an array of rows and columns of memory cells, wherein there is one row of the rows for each of a plurality of neurons of the spiking neural network, and columns for each of a plurality of time slots; in response to each of at least one firing neuron of the neurons firing a spike over a synapse at a current timeslot represented by a current column of the columns: indicating in the current column in the row of the memory cells for the firing neuron that the spike was fired in the current timeslot; indicating in the current column in rows of memory cells of idle neurons comprising neurons that did not file that a spike was not fired; using information in the array to determine a timing difference between a connected neuron and the firing neuron to which the connected neuron connects over a synapse; and using the determined timing difference to adjust a weight of the synapse connecting the firing neuron and the connected neurons.

In Example 22, the subject matter of examples 23-25 can optionally include generating a now pointer including an entry for each of the columns in the array, wherein entries in the now pointer correspond to time slots and include a current entry corresponding to the current column in the array and non-current entries corresponding to non-current timeslots, wherein the current entry is set to a first value and the non-current entries are set to a second value; and using the now pointer to indicate in at least one row of the at least one firing neuron the first value in the current column and the second value in the columns other than the current column, wherein the first value in one of the columns in the rows indicates firing of a spike at the time slot represented by the column in the row.

In Example 23, the subject matter of examples 22, 24, and 25 can optionally include that the using the now pointer comprises: writing the first value and the second values in the entries of the now pointer to corresponding columns in the at least one row of the at least one firing neuron, wherein each of the rows includes one column entry having the first value and all other of the column entries having the second value.

In Example 24, the subject matter of examples 22, 23, and 25 can optionally include that the memory device includes, for each of the rows of the array, a word line through cells in the row of the memory device and, for each of the columns of the array, at least one bit line through the cells in the column of the array, further comprising: setting all cells in the current column to ground to set to the second value using the bit line for the current column; and activating the word lines for each row of the at least one firing neuron to write entries of the now pointer to the cells of the row.

In Example 25, the subject matter of examples 22-24 can optionally include determining a difference of a first column location number in the array having the first value for the firing neuron and a second column location number in the array having the first value for the connected neuron; and determining a timing difference between the firing neuron and the connected neuron based on the first and second column location numbers.

Example 26 is an apparatus for implementing a spiking neural network program to maintain timing information on when neurons fire, comprising: means for generating a spike history in a memory device having an array of rows and columns of memory cells, wherein there is one row of the rows for each of a plurality of neurons of the spiking neural network, and columns for each of a plurality of time slots; means for performing, in response to each of at least one firing neuron of the neurons firing a spike over a synapse at a current timeslot represented by a current column of the columns, the steps of: indicating in the current column in the row of the memory cells for the firing neuron that the spike was fired in the current timeslot; indicating in the current column in rows of memory cells of idle neurons comprising neurons that did not file that a spike was not fired; using information in the array to determine a timing difference between a connected neuron and the firing neuron to which the connected neuron connects over a synapse; and using the determined timing difference to adjust a weight of the synapse connecting the firing neuron and the connected neurons.

What is claimed:
1. A neuromorphic computing device comprising:
a memory device including neural network information; and
a spiking neural network program that processes the neural network information in a memory device to:
generate a spike history in the memory device having an array of rows and columns of memory cells, wherein there is one row of the rows for each of a plurality of neurons of a spiking neural network, and columns for each of a plurality of time slots;

generate a now pointer including an entry for each of the columns in the array, wherein entries in the now pointer correspond to time slots and include a current entry corresponding to a current column in the array and non-current entries corresponding to non-current timeslots, wherein the current entry is set to a first value and the non-current entries are set to a second value; and in response to each of at least one firing neuron of the neurons firing a spike over a synapse at a current timeslot represented by a current column of the columns as indicated in the now pointer:

indicate in the current column, corresponding to the entry in the now pointer having the first value, in the row of the memory cells for each of at least one firing neuron, that the spike was fired in the current timeslot;

indicate in the current column, in rows of memory cells of idle neurons comprising neurons that did not fire, the second value indicating that a spike was not fired;

use information in the array to determine a timing difference between a connected neuron and the firing neuron to which the connected neuron connects over a synapse; and use the determined timing difference to adjust a weight of the synapse connecting the firing neuron and the connected neurons.

2. The neuromorphic computing device of claim 1, wherein the use the now pointer comprises:

write the first value and the second value in the entries of the now pointer to corresponding columns in at least one row of the at least one firing neuron, wherein each of the rows includes one column entry having the first value and all other of the column entries having the second value.

3. The neuromorphic computing device of claim 1, wherein the memory device includes, for each of the rows of the array, a word line through cells in the row of the memory device and, for each column of the columns of the array, at least one bit line through the cells in the column of the array, further to:

set all cells in the current column to ground to set to the second value using the bit line for the current column; and activate the word lines for each row of the at least one firing neuron to write entries of the now pointer to the cells of the row.

4. The neuromorphic computing device of claim 1, wherein the now pointer comprises a circular shift register, further to:

in response to a new time cycle, simultaneously shift a value in a first entry through a next to last entry in the now pointer to a right and shifting a value in a last entry to the first entry.

5. The neuromorphic computing device of claim 1, wherein the determine the timing difference comprises:

determine a difference of a first column location number in the array having the first value for the firing neuron and a second column location number in the array having the first value for the connected neuron; and determine a timing difference between the firing neuron and the connected neuron based on the first and second column location numbers.

6. The neuromorphic computing device of claim 1, wherein the now pointer comprises a circular shift register, wherein the determine the timing difference comprises:

(a number of entries in the now pointer plus a first column location number in the array having the first value for the firing neuron minus a second column location number in the array having the first value for the connected neuron) modulo the number of entries in the now pointer.

7. The neuromorphic computing device of claim 1, further to:

set reset bit lines for a reset port for the current column of the array to set all cells in the current column of the array corresponding to the current entry in the now pointer to the second value; and after setting all the entries in the current column of the array to the second value, apply the now pointer along at least one word line for the at least one firing neuron to write the first value and the second in the entries of the now pointer to corresponding columns in the rows of the at least one firing neuron, wherein the row for each of the at least one firing neuron includes the current column having the first value and all other of the columns having the second value.

8. The neuromorphic computing device of claim 1, wherein the adjust the weight of the synapse for each of at least one pair of the firing neuron and the connected neuron comprises:

calculate a weight for the synapse based on the determined timing difference in response to one of the columns in the row for the connected neuron indicating that the connected neuron did fire, wherein a weight for the synapse is unchanged in response to all the columns in the row for the connected neuron indicating that the connected neuron did not fire.

9. The neuromorphic computing device of claim 1, wherein in response to each of the at least one firing neuron firing the spike:

determine at least one connected postsynaptic neuron connected to the firing neuron over at least one synapse; and for each of the at least one connected postsynaptic neuron, do:

determine a potential based on the weight of the synapse between the connected postsynaptic neuron and the firing neuron;

increment a membrane potential for the connected postsynaptic neuron by the determined potential; and fire a spike by the connected postsynaptic neuron in response to the membrane potential exceeding a threshold.

10. The neuromorphic computing device of claim 1, wherein connected neurons connected to firing neurons includes fan-in presynaptic neurons that fire spikes to the firing neuron over synapses and fan-out postsynaptic neurons that receive the spikes fired by the firing neurons.

11. The neuromorphic computing device of claim 1, comprising at least one of a computer readable storage medium including program code implementing the spiking neural network program executed by a processor and an integrated circuit hardware device implementing hardware logic dedicated to implementing the spiking neural network program.

12. A memory device, comprising:

a spike history having an array of rows and columns of memory cells, wherein there is one row of the rows for each of a plurality of neurons of a spiking neural network, and columns for each of a plurality of time slots; and a now pointer including an entry for each of the columns in the array, wherein entries in the now pointer correspond to time slots and include a current entry corresponding to a current column in the array and non-current entries corresponding to non-current timeslots, wherein the current entry is set to a first value and the non-current entries are set to a second value, wherein the current column in the spike history of the columns represents a current timeslot, wherein the current column, corresponding to the entry in the now pointer having the first value, in the row of the memory cells for each of at least one firing neuron indicates that a spike was fired in the current timeslot, wherein the current column in rows of memory cells of idle neurons comprising neurons that did not fire indicate the second value indicating that a spike was not fired, wherein information in the array is used to determine a timing difference between a connected neuron and the firing neuron to which the connected neuron connects over a synapse, and wherein the determined timing difference is used to adjust a weight of the synapse connecting the firing neuron and the connected neurons.

13. The memory device of claim 12, further comprising:
for each of the rows of the array, a word line through cells in the row of the memory device and, for each column of the columns of the array, at least one bit line through the cells in the column of the array, wherein all cells in the current column are set to ground to set to the second value using the bit line for the current column, and wherein the word lines for each row of the at least one firing neuron are activated to write entries of the now pointer to the cells of the row.

14. The memory device of claim 12, further comprising:
reset bit lines for a reset port for the current column of the array that is set to set all cells in the current column of the array corresponding to the current entry in the now pointer to the second value; and
a word line for each of the neurons, wherein after setting all the entries in the current column of the array to the second value, the now pointer is applied along at least one word line for the at least one firing neuron to write the first value and the second value in the entries of the now pointer to corresponding columns in the rows of the at least one firing neuron, wherein the row for each of the at least one firing neuron includes the current column having the first value and all other of the columns having the second value.

15. A system, comprising:
a memory device; and
a neuromorphic computing device implementing a spiking neural network program to:
generate a spike history in the memory device having an array of rows and columns of memory cells, wherein there is one row of the rows for each of a plurality of neurons of a spiking neural network, and columns for each of a plurality of time slots;
generate a now pointer including an entry for each of the columns in the array, wherein entries in the now pointer correspond to time slots and include a current entry corresponding to a current column in the array and non-current entries corresponding to non-current timeslots, wherein the current entry is set to a first value and the non-current entries are set to a second value, in response to each of at least one firing neuron of the neurons firing a spike over a synapse at a current timeslot represented by a current column of the columns as indicated in the now pointer:
indicate in the current column, corresponding to the entry in the now pointer having the first value, in the row of the memory cells for each of at least one firing neuron that the spike was fired in the current timeslot;
indicate in the current column, in rows of memory cells of idle neurons comprising neurons that did not fire, the second value indicating that a spike was not fired;
use information in the array to determine a timing difference between a connected neuron and the firing neuron to which the connected neuron connects over a synapse; and
use the determined timing difference to adjust a weight of the synapse connecting the firing neuron and the connected neurons.

16. The system of claim 15, wherein the use the now pointer comprises:
write the first value and the second value in the entries of the now pointer to corresponding columns in at least one row of the at least one firing neuron, wherein each of the rows includes one column entry having the first value and all other of the column entries having the second value.

17. The system of claim 15, wherein the memory device includes, for each of the rows of the array, a word line through cells in the row of the memory device and, for each column of the columns of the array, at least one bit line through the cells in the column of the array, further to:
set all cells in the current column to ground to set to the second value using the bit line for the current column; and
activate the word lines for each row of the at least one firing neuron to write entries of the now pointer to the cells of the row.

18. A method for implementing a spiking neural network program in a neuromorphic computing device, comprising:
generating a spike history in a memory device having an array of rows and columns of memory cells, wherein there is one row of the rows for each of a plurality of neurons of a spiking neural network, and columns for each of a plurality of time slots;
generating a now pointer including an entry for each of the columns in the array, wherein entries in the now pointer correspond to time slots and include a current entry corresponding to a current column in the array and non-current entries corresponding to non-current timeslots, wherein the current entry is set to a first value and the non-current entries are set to a second value; and
in response to each of at least one firing neuron of the neurons firing a spike over a synapse at a current timeslot represented by a current column of the columns as indicated in the now pointer:
indicating in the current column, corresponding to the entry in the now pointer having the first value, in the row of the memory cells for each of at least one firing neuron that the spike was fired in the current timeslot;
indicating in the current column, in rows of memory cells of idle neurons comprising neurons that did not fire, the second value indicating that a spike was not fired;

using information in the array to determine a timing difference between a connected neuron and the firing neuron to which the connected neuron connects over a synapse; and using the determined timing difference to adjust a weight of the synapse connecting the firing neuron and the connected neurons.

19. The method of claim 18, wherein the using the now pointer comprises:

writing the first value and the second value in the entries of the now pointer to corresponding columns in at least one row of the at least one firing neuron, wherein each of the rows includes one column entry having the first value and all other of the column entries having the second value.

20. The method of claim 18, wherein the memory device includes, for each of the rows of the array, a word line through cells in the row of the memory device and, for each column of the columns of the array, at least one bit line through the cells in the column of the array, further comprising:

setting all cells in the current column to ground to set to the second value using the bit line for the current column; and activating the word lines for each row of the at least one firing neuron to write entries of the now pointer to the cells of the row.

21. The method of claim 18, wherein the determining the timing difference comprises:

determining a difference of a first column location number in the array having the first value for the firing neuron and a second column location number in the array having the first value for the connected neuron; and determining a timing difference between the firing neuron and the connected neuron based on the first and second column location numbers.

* * * * *